United States Patent [19]

Kawakami et al.

[11] Patent Number: 4,625,253
[45] Date of Patent: Nov. 25, 1986

[54] MAGNETIC TAPE CASSETTE

[75] Inventors: Kenji Kawakami, Kanagawa; Norikazu Horikawa, Tokyo; Yoshinori Yamamoto, Kanagawa, all of Japan

[73] Assignee: Sony Corporation, Tokyo, Japan

[21] Appl. No.: 649,725

[22] Filed: Sep. 12, 1984

[30] Foreign Application Priority Data

Sep. 19, 1983 [JP] Japan ................................ 58-172668

[51] Int. Cl.⁴ ............................................. G11B 23/08
[52] U.S. Cl. ..................................... 360/132; 242/198
[58] Field of Search ........................... 360/132, 85, 133; 206/387; 242/197, 198, 199, 200

[56] References Cited

FOREIGN PATENT DOCUMENTS 146218  1/1981  Fed. Rep. of Germany ...... 360/132
57-147174  9/1982  Japan ................................. 360/132

Primary Examiner—John H. Wolff
Assistant Examiner—Matthew J. Bussan
Attorney, Agent, or Firm—Lewis H. Eslinger; Alvin Sinderbrand

[57] ABSTRACT

A magnetic tape cassette for use in a magnetic recording/reproducing apparatus has a sliding plate provided on a lower surface to selectively cover and expose insertion apertures that open into the interior of the cassette. A front lid is provided which may be pivoted to either expose or cover a front opening in the cassette through which tape may be withdrawn for a recording/reproducing operation. When the front lid is in its closed position and the sliding plate covers the insertion apertures, the front lid is locked in its closed position. The magnetic tape cassette is thereby closed to prevent dust, oil and other contaminants from damaging the magnetic tape within.

12 Claims, 13 Drawing Figures

MAGNETIC TAPE CASSETTE

BACKGROUND OF THE INVENTION

1. Field of the Invention

The present invention relates generally to magnetic tape cassettes and more particularly is directed to a magnetic tape cassette suitable for use in a recording-/reproducing apparatus for recording digital signals, for example pulse code modulated signals.

2. Description of the Prior Art

Magnetic recording/reproducing apparatus for recording signals on and reproducing signals from magnetic tape are well known in the art. In such apparatus, an analog signal, such as an audio signal, is converted into a digital signal, which may be a pulse code modulated (PCM) signal, and then recorded at a high density on a magnetic tape contained in a cassette by means of a rotary magnetic head. Upon a recording or reproducing operation, the magnetic tape is withdrawn from the cassette and wound around the periphery of a rotary drum within which the rotary head is provided. An opening at the front of the cassette is provided for permitting withdrawal of the tape from the cassette.

In addition, the tape is wound about two reel hubs within the cassette, which receive drive shafts of the recording/reproducing apparatus when the cassette is inserted therein for winding or rewinding the tape. In order to permit the reel shafts to be inserted into the reel hubs, the cassette has insertion apertures which receive the reel hubs with a small degree of clearance, so that the hubs may be smoothly rotated.

It is very important in such a cassette that the magnetic tape be protected from contamination by oil or dust. If the tape is contaminated, the signal cannot properly be reproduced and a drop-out in the reproduced signal occurs, leading to reduced quality in the reproduced audio signal. Therefore, to prevent such contamination, as from fingerprints or dust and pollution in the atmosphere, the magnetic surface of the tape should ideally be maintained sealed within the cassette. However, the front opening and apertures described above constitute openings through which dust and unwary fingers may enter to damage the tape.

In order to close the front opening in a cassette of this type, there has been proposed a cassette with a pivotable front lid which covers the front of the cassette. This rotatable front lid can cover either the front surface or the magnetic surface of the magnetic tape, and an opening is provided in the front lid for inserting therethrough a tape guide system for withdrawing the magnetic tape from the tape cassette.

However, with this proposed tape cassette, it is still possible for the magnetic tape to be touched or contaminated through the space through which the tape guide system is inserted. Moreover, although the magnetic surface of the tape is covered by the front lid, there is still a small clearance between the front lid and the magnetic surface of the tape, so that dust and contamination may still reach the magnetic surface of the tape and adhere thereto.

Therefore, it has been further proposed that an inner lid be provided inside the front lid to cover the tape surface opposed to the magnetic surface, so that the magnetic tape will be enclosed between the front lid and the inner lid. Although in such a tape cassette the magnetic tape is protected, this construction is relatively complicated and assembly thereof may be quite difficult.

OBJECTS AND SUMMARY OF THE INVENTION

Accordingly, it is an object of the present invention to provide an improved magnetic tape cassette which avoids the difficulties of the prior art.

It is another object of the present invention to provide a magnetic tape cassette having a simple construction which can be assembled with ease.

It is a further object of the present invention to provide a magnetic tape cassette having a construction which prevents dust and contamination from reaching the magnetic tape and which further prevents touching of the magnetic tape by fingers, or other objects.

It is another object of the present invention to provide a magnetic tape cassette in which the front lid is locked against inadvertent opening when the cassette is not in use.

It is yet another object of the present invention to provide a magnetic tape cassette of the above type suitable for use in an apparatus for recording and reproducing a digital signal, for example a pulse code modulated signal.

Therefore, in accordance with one aspect of the present invention, there is provided a magnetic tape cassette which comprises a casing enclosing first and second reel hubs adapted to have a magnetic tape wound thereabout, a first surface of the casing having first and second reel shaft insertion apertures into which the first and second reel hubs are inserted, respectively, with a small degree of clearance, and a cut-out portion through which the magnetic tape may be withdrawn from the cassette, and sliding plate means provided on the first surface and freely slidable between first and second positions thereon, so that, in the first position of the sliding plate means, the first and second insertion apertures and the cut-out portion are exposed for respectively receiving first and second reel shafts and tape withdrawing means and, in the second position, the sliding plate means covers the first and second insertion apertures and the cut-out portion, whereby the magnetic tape in the cassette is protected from external contamination. The magnetic tape cassette according to the present invention has a simple construction and may be assembled with ease. Furthermore, the construction of the magnetic tape cassette according to the present invention prevents dust and other contaminants from reaching the magnetic tape to adhere thereto and further prevents fingers and other objects from touching the magnetic tape.

According to another aspect of the present invention, the magnetic tape cassette is further provided with means for locking a front lid against rotation when the tape cassette is not inserted in the recording/reproducing apparatus, so that the front lid is prevented from being opened unintentionally.

These and other objects, features and advantages of the present invention will become apparent from the following detailed description taken in conjunction with the accompanying drawings, throughout which like references designate like elements and parts.

DESCRIPTION OF THE PREFERRED EMBODIMENTS

Figure 1:
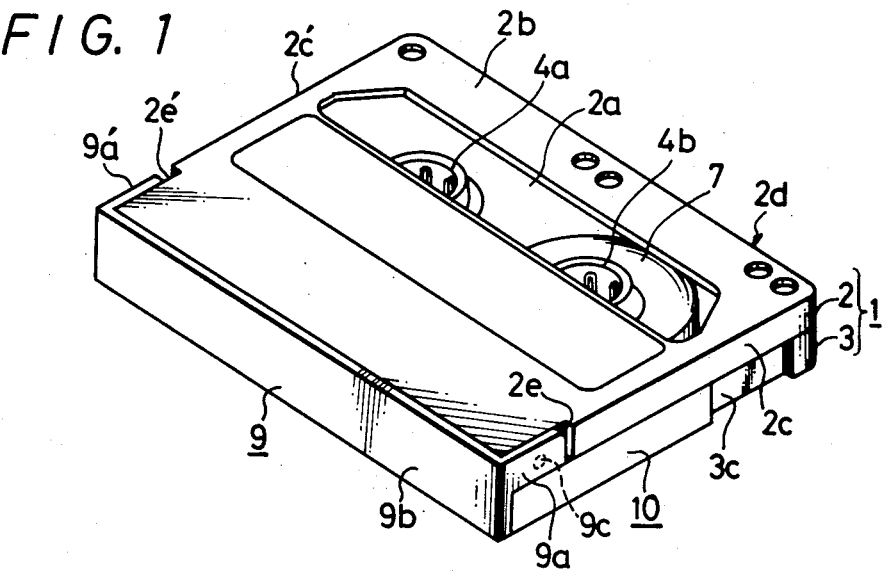
FIG. 1 is a top perspective view of an embodiment of the magnetic tape cassette according to the present invention.

The illustrated embodiments of the invention differ only slightly, namely with respect to the rounding or squaring of the corners of arms 9a, 9a'. Either construction can be used, as long as the arms 9a, 9a' cooperate with a sliding plate 10 to lock a front lid 9 in the closed position in the matter described below.

A preferred embodiment of the magnetic tape cassette according to the present invention will now be described with reference to the drawings, and initially with reference to FIGS. 1 and 2 thereof. As illustrated therein, the magnetic tape cassette according to the present invention has a casing 1 with an front opening 1a (FIG. 2) at the front portion of casing 1. Casing 1 has an upper half portion 2 and a lower half portion 3 which may be manufactured separately and joined together by means of screws, bolts, or the like (not illustrated), and front opening 1a is constituted by the opening defined between upper half portion 2 and lower half portion 3 when they are joined together. Upper half portion 2 has a transparent window portion 2a in an upper wall 2b, right and left upper side walls 2c, 2c' and a rear wall 2d. Upper side walls 2c, 2c' have indented stepped portions 2e, 2e', with a predetermined depth to provide a smooth exterior wall of the complete magnetic tape cassette when assembled, as will be discussed in detail later.

Lower half portion 3 includes a cut-out portion 3a which is formed by cutting away a portion of a bottom wall 3b in a rectangular shape. Together, front opening 1a and cut-out portion 3a form an L-shaped space through which the tape may be withdrawn. That is, when the tape cassette according to the present invention is inserted in a recording/reproducing apparatus, a tape guide system (not illustrated) is inserted into casing 1 through cut-out portion 3a. During a recording or reproducing operation this tape guide system withdraws the tape from casing 1 through front opening 1a.

First and second reel hubs 4a, 4b (FIG. 1) held within casing 1 are inserted into a corresponding pair of reel shaft insertion apertures 5 and 6 (FIG. 2), formed in the bottom wall 3b of lower half portion 3. A magnetic tape 7 is wound about reel hubs 4a, 4b. Again, it is contemplated that when the cassette is inserted into the recording/reproducing apparatus, a pair of drive shafts (not illustrated) will extend through insertion apertures 5, 6 to drivingly engage reel hubs 4a, 4b for winding and rewinding magnetic tape 7. Therefore, reel hubs 4a, 4b are designed to have a small degree of clearance within insertion apertures 5 and 6, so that they may be freely driven by the drive shafts.

Also in the bottom surface wall 3b are a pair of positioning apertures 8a and 8b at predetermined positions located closer to front opening 1a and spaced apart farther than insertion apertures 5, 6. Positioning apertures 8a, 8b are adapted to be engaged by positioning members (not illustrated) with the recording/reproducing apparatus for holding the cassette in a stable position during operation. Lower half portion 3 further includes right and left lower side walls 3c, 3c', respectively corresponding to and aligned with left and right upper side walls 2c, 2c' of upper half portion 2. A stop flange 3d is provided on lower wall 3b at the rear portion of housing 1 and runs the entire width of the cassette.

Located at the front portion of housing 1 is a front lid 9, having a U-shaped configuration when viewed from above and an L-shaped configuration when viewed from the side, which is rotatably pivoted to upper side walls 2c, 2c' of casing 1 at indented stepped portions 2e, 2e'. Front lid 9 is formed of a plate member 9b having approximately the same rectangular shape as the front opening 1a of casing 1, such that when front lid 9 is rotated to overlie front opening 1a, front opening 1a is completely covered. Front lid 9 further has arm members 9a, 9a' which are extensions of plate member 9b bent at right angles thereto. Arm members 9a, 9a' are pivotally connected through shafts 9c, 9c' to side walls 2c, 2c' at stepped portions 2e, 2e', respectively.

Front lid 9 can be rotatably positioned in closed and opened positions. In its closed position, front lid 9 covers front opening 1a to protect magnetic tape 7 from contamination when the cassette is not in use, that is, when it is not within the recording/reproducing apparatus. When front lid 9 is rotated to its closed position to cover front opening 1a, arm members 9a, 9a' overlie only the stepped portions 2e, 2e' of upper side walls 2c, 2c'. In its open position, to which it is rotated when within the recording/reproducing apparatus, front lid 9 is rotated upwardly to expose front opening 1a, so that magnetic tape 7 may be withdrawn from the cassette.

Provided on the bottom wall 3b is a sliding plate 10 having a substantially U-shaped cross-section, which opposes and slides along the bottom wall 3b of lower half portion 3 in both the forward and rearward direction between a first, forewardmost position and a second, rearmost position. Sliding plate 10 includes a lower plate 10a with the same width as lower wall 3b, but with a lesser extent in the forward and backward direction. Side plates 10b, 10b', extend from the right and left edges of lower plate 10a and overlie lower side walls 3c, 3c', respectively. Guide runners 10c, 10c' extend inwardly from side plates 10b, 10b', respectively.

In order that sliding plate 10 may be freely slid in the forward and rearward direction of casing 1 between its first and second positions, guide grooves 11, 11' are respectively formed by a spacing between upper and lower right side walls 2c, 3c and upper and lower left side walls 2c', 3c' over the desired sliding range of sliding plate 10. Guide runners 10c, 10c' respectively engage guide grooves 11, 11' for guiding the sliding plate 10 along its path.

Figure 4:
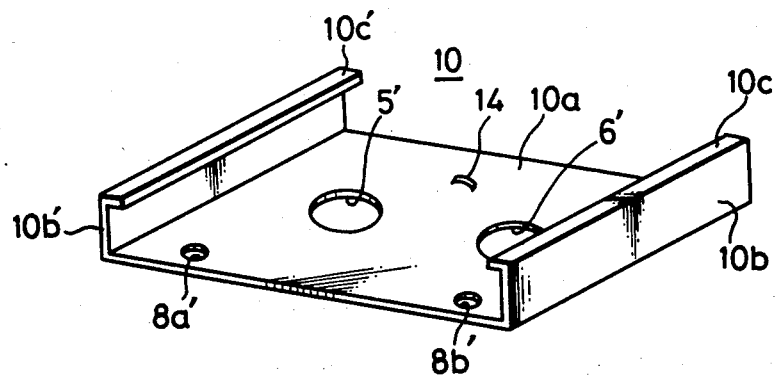
FIG. 4 is a top perspective view of a sliding plate provided on the cassette according to the present invention.

A rectangular groove or slit 12 (FIG. 2) is formed in the center of bottom wall 3b of lower half portion 3 so that its longitudinal direction is coincident with the direction along which sliding plate 10 travels. A return spring 13 located within rectangular groove 12 is fixed at one end 13a to the portion of bottom wall 3b at the front of rectangular groove 12. The other end 13b of return spring 13 is adapted to be engaged by a spring engaging member 14 (FIG. 4) on sliding plate 10 to bias sliding plate 10 into its second position, i.e. towards the front portion of the housing 1.

Sliding plate 10 embodies an important aspect of the present invention, in that it provides the means by which the apertures in casing 1, that is, insertion apertures 5, 6 and positioning apertures 8a, 8b, are covered when the cassette is not in use and exposed when the cassette is in use.

In accordance with this important aspect of the present invention, apertures 5', 6', 8a', and 8b' are provided in lower plate 10a of sliding plate 10, which respectively correspond to insertion apertures 5, 6 and positioning apertures 8a, 8b of lower wall 3b. These apertures are located on lower plate 10a, so that, when sliding plate 10 is positioned on lower wall 3b in its first position (FIG. 8), apertures 5', 6', 8a', 8b' will respectively overlie apertures 5, 6, 8a, 8b to form continuous apertures through which the drive shafts and positioning members may be inserted. Conversely, when sliding plate 10 is in its second position (FIG. 5), insertion apertures 5, 6, positioning apertures 8a, 8b, and cut-out portion 3a are covered by solid portions of sliding plate 10, while apertures 5', 6', 8a', 8b' all overlie solid portions of lower wall 3b. Thus, in the second position, sliding plate 10 forms a protective barrier to prevent the entry of dust or fingers which might damage magnetic tape 7.

When front lid 9 is in its closed position, sliding plate 10 may be slid forward to its second position where the front edge of sliding plate 10 contacts plate member 9b of front lid 9. The results in the highly advantageous feature that front lid 9 is now locked against inadvertant opening, as will be discussed below. When sliding plate 10 is slid to its first position where its rearmost edge abuts stop flange 3d, front lid 9 is released. Thus, sliding plate 10 may be slid between its first and second positions for producing the advantageous features of the present invention.

Figure 2:
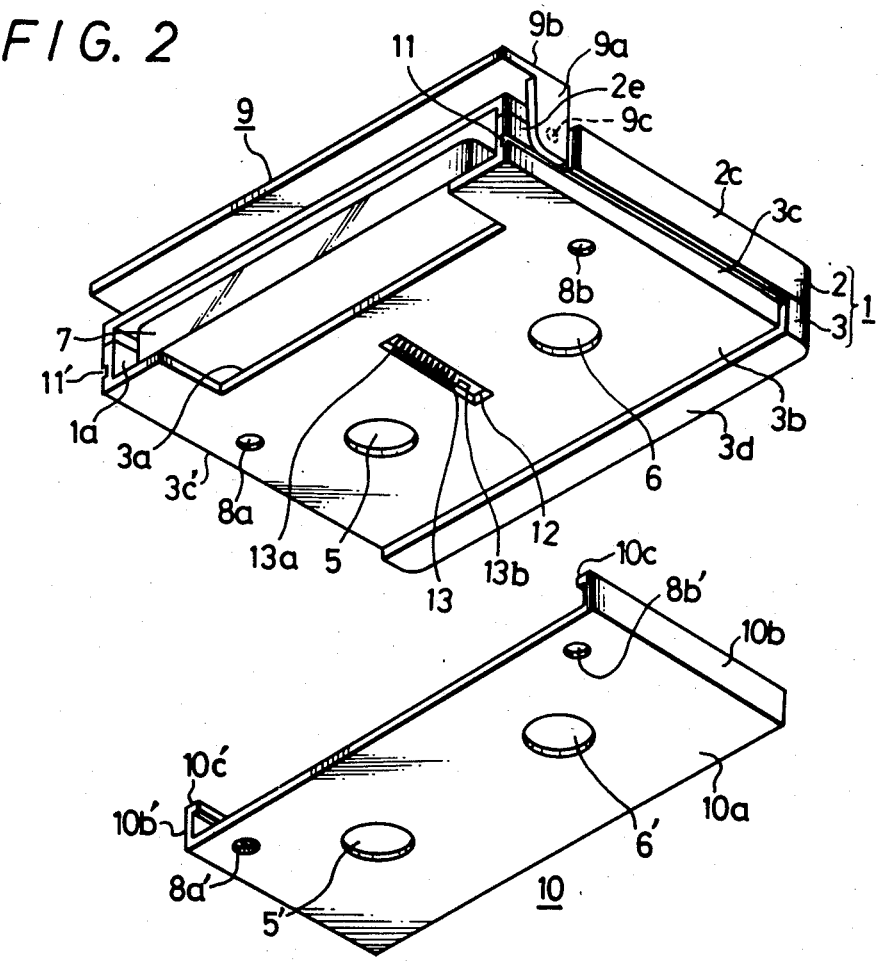
FIG. 2 is an exploded bottom perspective view of a slightly modified form of the cassette of FIG. 1.
Figure 3:
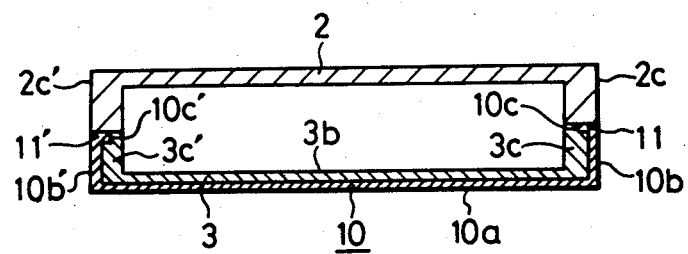
FIG. 3 is a side cross-sectional view of the cassette of FIG. 1.

In order that the cassette according to the present invention may have smooth, planar exterior walls, as illustrated in FIGS. 1 and 3, it may be seen that stepped portions 2e, 2e' have a depth equal to the thickness of arm members 9a, 9a' of front lid 9 (FIG. 1). In addition, right and left lower side walls 3c, 3c' are similarly reduced in thickness by the thickness of side plates 10b, 10b' of sliding plate 10 (FIG. 3). By this means the exterior surface of upper side walls 2c, 2c' form a smooth plane with the exterior surfaces of side plates 10b, 10b' and arm members 9a, 9a', respectively. Similarly, stop flange 3d extends below lower wall 3b by a thickness equal to that of lower wall 10a (FIG. 9), so that when sliding plate 10 has been slid to its second position to abut stop flange 3d, the exterior surfaces of stop flange 3d and lower wall 10a form another smooth plane. Thus, stop flange 3d not only serves to limit the rearward sliding of sliding plate 10, but also creates a smooth exterior wall with the sliding plate 10.

Figure 5:
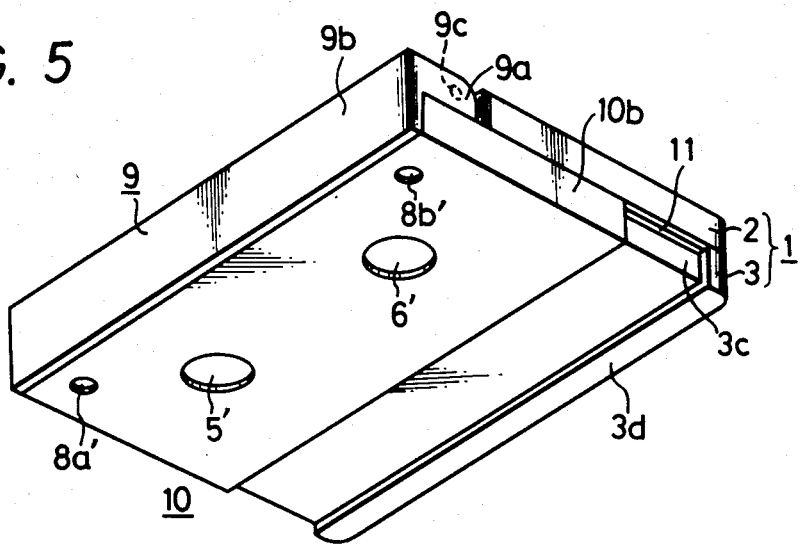
FIG. 5 is a bottom perspective view of the cassette of FIG. 1, illustrating the configuration of the cassette in an initial state when not in use.

The operation of the magnetic tape cassette according to the present invention will now be described in detail with reference to FIGS. 5 to 13, and initially with reference to FIGS. 5 to 7, which show different views of the magnetic tape cassette when it is not in use and removed from the recording/reproducing apparatus. As illustrated, when the cassette is not in use, front lid 9 is in its closed position to cover front opening 1a and sliding plate 10 is in its second, or forwardmost, position with the front edge of sliding plate 10 abutting front plate member 9b of front lid 9. In this initial state, it may be seen from FIG. 7 that apertures 5', 6' do not overlie insertion apertures 5, 6, nor do apertures 8a', 8b' overlie positioning apertures 8a, 8b. Rather, these apertures are respectively displaced from each other, so that lower wall 3a and sliding plate 10 form a continuous barrier along the lower surface of the tape cassette to prevent dust, oil, and other contaminants from entering the cassette and damaging magnetic tape 7. It will be further noted that sliding plate 10 also overlies and covers cut-out portion 3a, indicated in dotted lines in FIG. 7, so that this portion also is covered and protected. It is to this end that positioning apertures 8a and 8b are located forwardly and to the sides of insertion apertures 5, 6, so that corresponding apertures 8a', 8b' may be located on sliding plate 10 on either side of the portion of sliding plate 10 adapted to overlie cut-out portion 3a. Therefore, all openings into the cassette are completely covered and sealed against contamination. That is, front opening 1a, cut-out portion 3a, insertion apertures 5 and 6 and positioning apertures 8a and 8b are all covered by the front lid 9 and sliding plate 10.

Figure 6:
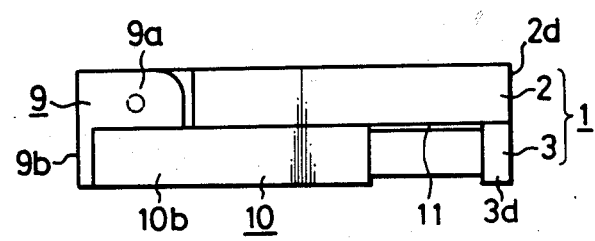
FIG. 6 is a side elevation view of the cassette of FIG. 5.
Figure 7:
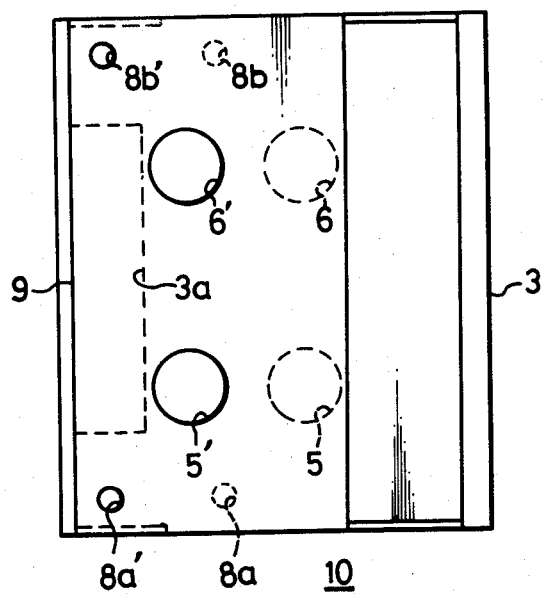
FIG. 7 is a bottom plan view of the cassette of FIG. 5.

A further advantageous feature of the magnetic tape cassette according to the present invention may be clearly seen from FIG. 6. As illustrated there, when front lid 9 is in its closed position and sliding plate 10 is in its second position, side plates 10b of sliding plate 10 are positioned directly beneath arm members 9a of front lid 9 and the upper edges of the side plates 10b closely oppose the lower edges of arm members 9a. Accordingly, even if front lid 9 were loosely connected to casing 1 so that it had a tendency to rotate, or if a user attempted to manually rotate front lid 9, side plates 10b would prevent the rotation of front lid 9, thus locking front lid 9 against rotation to further insure the closure of the tape cassette against contaminants. When the cassette is fully assembled, spring engaging member 14 engages return spring 13 at its end 13b such that sliding plate member 10 is yieldingly retained in its second position abutting front lid 9. Thus, when the tape cassette according to the present invention is not in use, it presents a continuous closed surface surrounding the tape, such that magnetic tape 7 is not exposed to contaminants or rough handling.

Figure 8:
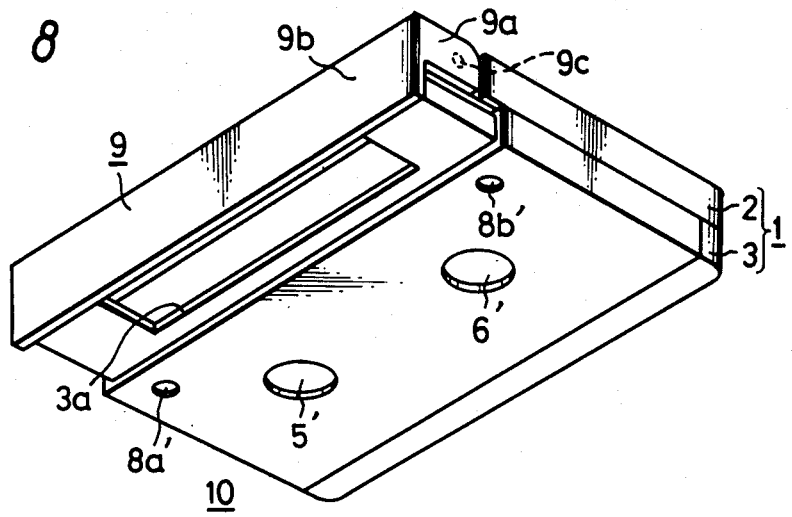
FIG. 8 is a bottom perspective view of the cassette of FIG. 5, illustrating the configuration of the cassette in an intermediate state as it is being inserted into recording/reproducing apparatus.
Figure 9:
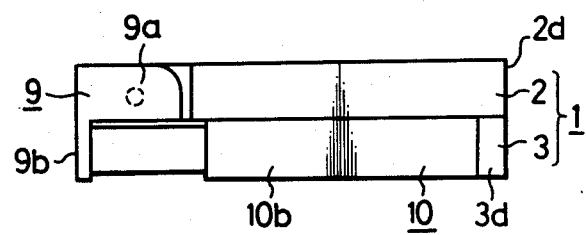
FIG. 9 is a side elevation view of the cassette of FIG. 8.
Figure 10:
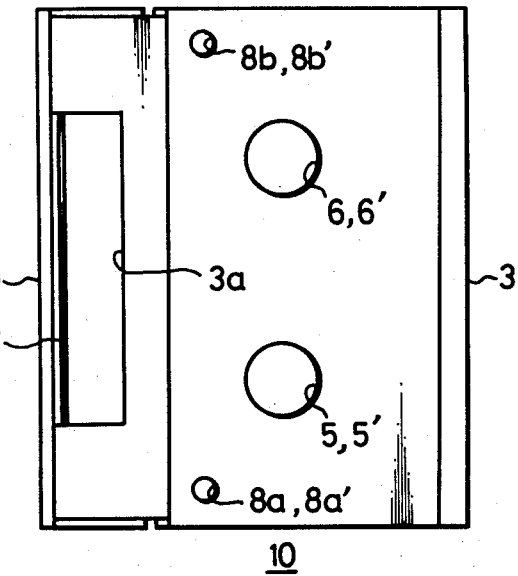
FIG. 10 is a bottom plan view of the cassette of FIG. 8.

FIGS. 8 to 10 illustrate an intermediate state of the novel tape cassette as it is being inserted into the recording/reproducing apparatus. As the cassette is inserted, sliding plate 10 is engaged by an engaging member of the recording/reproducing apparatus (not illustrated) and is slid rearwardly against the biasing force of return spring 13 to its first position abutting stop flange 3d (FIG. 9). In this intermediate state, as clearly seen in FIG. 10, apertures 5', 6', 8a' and 8b' respectively overlie insertion apertures 5, 6 and positioning apertures 8a, 8b, so that the reel shafts and positioning members of the recording/reproducing apparatus may extend therethrough to engage with the cassette, as is conventional. In addition, cut-out portion 3a is also exposed so that the tape guide system for drawing out magnetic tape 7 may be inserted into casing 1 through cut-out portion 3a. When the tape case cassette is within the recording-/reproducing apparatus, it is protected by the apparatus itself from contaminants in the air and inexpert handling. Then, the necessary apertures to the interior of the cassette may be safely exposed for operation.

It should be noted that in this intermediate position, side plates 10b, 10b' no longer oppose arm members 9a, 9a' of front lid 9. Thus, front lid 9 is released from its locked state.

Figure 11:
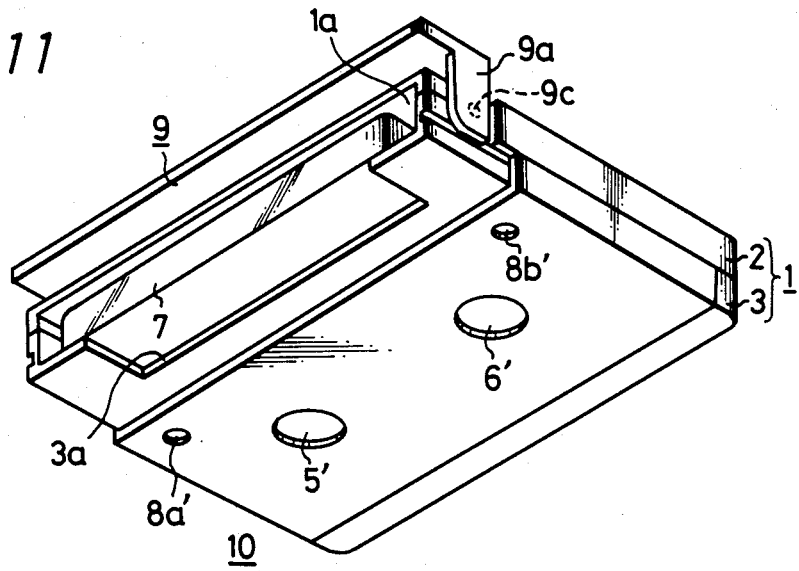
FIG. 11 is a bottom perspective view of the cassette of FIG. 2, illustrating the configuration of the cassette in a final state after insertion into the recording/reproducing apparatus.
Figure 12:
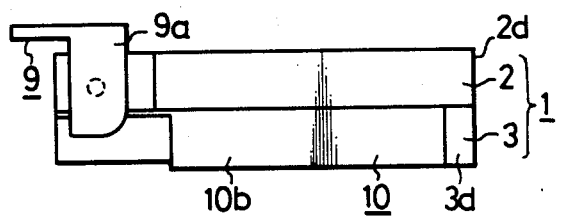
FIG. 12 is a side elevation view of the tape cassette of FIG. 1.
Figure 13:
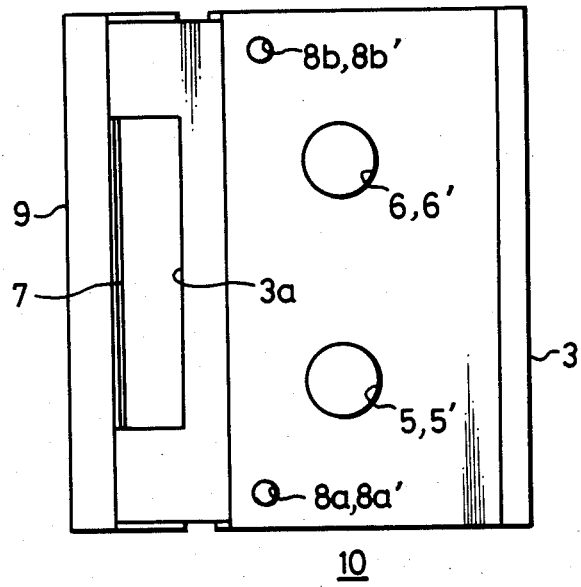
FIG. 13 is a bottom plan view of the tape cassette of FIG. 11.

Thereafter, in a final state of the cassette as illustrated in FIGS. 11 to 13, front lid 9 is rotated upwardly to its open position by the action of further engaging members (not illustrated) within the recording/reproducing apparatus. Once front opening 1a of casing 1 is thus exposed and magnetic tape 7 is presented at the front of casing 1, magnetic tape 7 may be drawn forward by the tape guide system, inserted through cut-out portion 3a, as is conventional. Thus, the magnetic tape cassette according to the present invention has been transformed from a completely closed, sealed box while not in use protecting magnetic tape 7 from contaminants to a fully operational and functional cassette within the recording/reproducing apparatus.

When it is desired to remove the magnetic tape cassette from the recording/reproducing apparatus, the operation is simply the reverse of the above-described steps from the final state to the intermediate state to the initial state. That is, upon actuation of an appropriate mechanism on the recording/reproducing apparatus, magnetic tape 7 is returned to the cassette by the tape guide system. Front lid 9 is then rotated to its closed position to cover front opening 1a. Then the tape guide system, the engaging members for engaging apertures 8a, 8b and the reel shafts are withdrawn from the cassette and the cassette itself is withdrawn from the recording/reproducing apparatus. As the tape cassette is withdrawn, the operation of return spring 13 causes sliding plate 10 to be returned to its second, forwardmost position to cover apertures 5, 6, 8a, and 8b and to seal magnetic tape 7 once again against contamination.

Thus, in the above-described embodiment of the magnetic tape cassette according to the present invention, the magnetic tape contained therein is at all times protected from contamination from dust, oil from touching, or physical damage to the tape. That is, when the novel tape cassette according to the present invention is outside the recording/reproducing apparatus and is not in use, all apertures into the interior of the casing are covered by sliding plate 10 and front lid 9. Alternatively, when the cassette is in use within the recording/reproducing apparatus and the apertures are exposed, the recording/reproducing apparatus itself forms a protective shield about the tape. In addition, when the sliding plate is in its second, forwardmost position, front lid 9 is locked against rotation, so that it may not be inadvertently opened with consequent damage to the tape.

The above description is given for a single preferred embodiment of the invention, but it will be apparent that many modifications and variations may be effected by those skilled in the art with departing from the spirit or scope of the present invention as defined in the appended claims.

What is claimed is:

1. A magnetic tape cassette, comprising:
    a casing enclosing first and second reel hubs adapted to have a magnetic tape wound thereabout;
    a first portion of said casing having first and second reel shaft insertion apertures for respectively receiving said first and second reel hubs and a marginal cut-out portion through which said magnetic tape may be withdrawn from said cassette; and
    sliding plate means provided on said first portion and freely slideable between first and second positions thereon, so that, in said first position of said sliding plate means, said first and second insertion apertures and said cut-out portion are exposed for respectively receiving first and second reel shafts and tape withdrawing means and, in second position, said sliding plate means covers said first and second insertion apertures and said cut-out portion, whereby said magnetic tape in said cassette is protected from external contamination;
    said casing including a front surface having a front opening therein;
    said magnetic tape cassette further comprising front lid means;
    said front lid means forming a freely pivoting connection adjacent to said front opening and being movable between a closed position covering said front opening and an open position exposing said front opening; and
    said sliding plate means in its second position engaging said front lid means in said closed position to maintain said front lid means in said closed position.

2. A magnetic tape cassette according to claim 1, further comprising means for resiliently urging said sliding plate means into said second position.

3. A magnetic tape cassette according to claim 1, wherein said casing further includes first and second parallel side walls;
    said front lid means has first and second arm members extending from opposed side edges thereof to overlie portions of said first and second side walls, respectively; and
    said sliding plate means in said second position engaging said first and second arm members to maintain said front lid means in said closed position.

4. A magnetic tape cassette according to claim 3, further comprising a shaft mounting each of said arm members on the respective side wall to provide rotation of said front lid means between its open and closed positions; said sliding plate means in its second position preventing said arm members from rotating about said shafts from said closed to said open position.

5. A magnetic tape cassette according to claim 3, wherein said front lid means includes a plate member of substantially the same size as said front opening;
    said arm members are extensions of said plate member formed by bending side end portions of said plate member at right angles; and
    said arm members have a thickness substantially equal to an indented depth of stepped portions of said side walls;
    further comprising shafts mounted on said stepped portions, said arm members being rotatably supported by said shafts.

6. A magnetic tape cassette according to claim 1, wherein said casing includes an upper half portion having a top wall and first and second upper side walls and a lower half portion having a bottom wall and first and second lower side walls aligned with said first and second upper side walls, respectively;
said sliding plate means slidingly engages said side walls of said casing for sliding movement between said first and second positions; and
said bottom wall constitutes said first portion and includes stop means for preventing disengagement of said sliding plate means from said casing.

7. A magnetic tape cassette, comprising:
a casing enclosing first and second reel hubs adapted to have a magnetic tape wound thereabout;
a first portion of said casing having first and second reel shaft insertion apertures for respectively receiving said first and second reel hubs and a marginal cut-out portion through which said magnetic tape may be withdrawn from said cassette; and
sliding plate means provided on said first portion and freely slidable between first and second positions thereon, so that, in said first position of said sliding plate means, said first and second insertion apertures and said cut-out portion are exposed for respectively receiving first and second reel shafts and tape withdrawing means and, in said second position, said sliding plate means covers said first and second insertion apertures and said cut-out portion, whereby said magnetic tape in said cassette is protected from extended contamination;
said casing including a front surface having a front opening therein;
said magnetic tape cassette further comprising front lid means pivotable between a closed position covering said front opening and an open position exposing said front opening;
said sliding plate means in its second position cooperating with said front lid means in said closed position to maintain said front lid means in said closed position;
said casing further including first and second parallel side walls;
said front lid means having first and second arm members extending from opposed side edges thereof to overlie portions of said first and second side walls, respectively;
said sliding plate means in said second position cooperating with said first and second arm members to maintain said front lid means in said closed position;
said front lid means including a plate member of substantially the same size as said front opening;
said arm members being extensions of said plate member formed by bending side portions of said plate member at right angles;
said arm members having a thickness substantially equal to an indented depth of stepped portions of said side walls;
further comprising shafts mounted on said stepped portion, said arm members being rotatably supported by said shafts;
said plate member and said arm members being formed in an L-shaped configuration and, when said sliding plate means is in said second position, an end portion of said sliding plate means contacting said arm members and said plate member to lock said front lid means against rotation, whereby said cassette casing is locked in a tightly closed condition.

8. A magnetic tape cassette, comprising:
a casing enclosing first and second reel hubs adapted to have a magnetic tape wound therabout;
a first portion of said casing having first and second reel shaft insertion apertures for respectively receiving said first and second reel hubs and a marginal cut-out portion through which said magnetic tape may be withdrawn from said cassette; and
sliding plate means provided on said first portion and freely slidable between first and second positions thereon, so that, in said first position of said sliding plate means, said first and second insertion apertures and said cut-out portion are exposed for respectively receiving first and second reel shafts and tape withdrawing means and, in said second position, said sliding plate means covers said first and second insertion apertures and said cut-out portion, whereby said mangetic tape in said cassette is protected from extended contamination;
said casing including an upper half portion having a top wall and first and second upper side walls and a lower half portion having a bottom wall and first and second lower side walls aligned with said first and second upper side walls, respectively;
said sliding plate means sliding engaging said side walls of said casing for sliding movement between said first and second positions; and
said bottom wall constituting said first portion and including stop means for preventing disengagement of said sliding plate means from said casing;
said upper walls opposing said lower side walls to define therebetween first and second guide grooves; and
said sliding plate means including a flat plate member overlying a portion of said bottom wall, first and second side plate members extending from opposed side edges of said flat plate member and respectively overlying said first and second lower side walls, and first and second guide members extending from said first and second side plate members and respectively engaging said first and second guide grooves.

9. A magnetic tape cassette according to claim 8, wherein exterior surfaces of said upper side walls and said respective side plate members lie in the same plane.

10. A magnetic tape cassette according to claim 8, wherein said casing includes a front surface having a front opening therein, said magnetic tape cassette further comprising front lid means freely rotatable between a closed position covering said front opening and an open position exposing said front opening, said front lid means having first and second arm members extending from opposed side edges thereof to overlie said first and second upper side walls, respectively; and
said first and second side plate members of said sliding plate means, when said sliding plate means is in said second position, cooperate with said first and second arm members, respectively, to maintain said front lid means in said closed position.

11. A magnetic tape cassette according to claim 10, wherein exterior surfaces of said upper side walls, said respective side plate members and said respective arm members all lie in the same plane.

12. A magnetic tape cassette according to claim 11, wherein said upper side walls have indented stepped portions formed at positions adjacent said front lid means for rotatably supporting said arm members of said front lid means, said stepped portions being indented to a depth equal to the width of said side plate members.

* * * * *